United States Patent
Jia et al.

(10) Patent No.: US 12,225,516 B2
(45) Date of Patent: Feb. 11, 2025

(54) APPARATUSES AND METHODS FOR SELECTIVELY SCANNING RESOURCES OF A COMMUNICATION NETWORK AND SYSTEM

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 338 days.

(21) Appl. No.: 17/702,863

(22) Filed: Mar. 24, 2022

(65) Prior Publication Data
US 2023/0309071 A1    Sep. 28, 2023

(51) Int. Cl.
*H04W 72/0453* (2023.01)
*H04W 24/08* (2009.01)
*H04W 48/16* (2009.01)

(52) U.S. Cl.
CPC ....... *H04W 72/0453* (2013.01); *H04W 24/08* (2013.01); *H04W 48/16* (2013.01)

(58) Field of Classification Search
CPC .. H04W 24/08; H04W 72/0453; H04W 48/16
See application file for complete search history.

(56) References Cited

U.S. PATENT DOCUMENTS

| 10,264,428 | B2 | 4/2019 | Egner et al. |
| 10,820,248 | B2 | 10/2020 | Gao et al. |
| 10,979,158 | B2 | 4/2021 | Yoon et al. |
| 11,019,633 | B2 | 5/2021 | Kwok et al. |
| 11,166,227 | B2 | 11/2021 | Shih et al. |
| 11,272,433 | B2 | 3/2022 | Karimli et al. |
| 11,490,264 | B2 | 11/2022 | Gummadi et al. |
| 2018/0054239 | A1* | 2/2018 | Bengtsson ............... H04B 1/00 |
| 2018/0076874 | A1* | 3/2018 | McLellan ............ H04B 7/0695 |
| 2018/0098304 | A1* | 4/2018 | Reial ................... H04W 68/005 |
| 2019/0075504 | A1* | 3/2019 | Santhanam ....... H04M 1/72457 |
| 2019/0124586 | A1* | 4/2019 | Sahin ................... H04W 48/16 |

(Continued)

OTHER PUBLICATIONS

Jia, Yupeng et al., "Apparatuses and Methods for Facilitating an Autonomous Detection of High Priority Frequency Bands and Ranges", U.S. Appl. No. 17/702,865, filed Mar. 24, 2022, 53 pages.

*Primary Examiner* — Chi Ho A Lee
(74) *Attorney, Agent, or Firm* — Guntin & Gust, PLC; Mark Wilinski

(57) ABSTRACT

Aspects of the subject disclosure may include, for example, transmitting a first value for a first parameter to a first user equipment, wherein the first parameter pertains to a first number of scans to be performed by the first user equipment to detect a first signal having a first frequency within a first frequency band as part of a first scanning procedure, and transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band. Other embodiments are disclosed.

20 Claims, 7 Drawing Sheets

(56) References Cited

U.S. PATENT DOCUMENTS

| | | | |
|---|---|---|---|
| 2019/0230626 A1* | 7/2019 | Rune | H04W 72/046 |
| 2020/0314861 A1* | 10/2020 | Goel | H04W 72/563 |
| 2021/0396831 A1* | 12/2021 | Fleischer | G01S 3/42 |
| 2021/0409253 A1* | 12/2021 | Nitsche | H04L 27/2676 |
| 2022/0053481 A1* | 2/2022 | Akkarakaran | H04L 5/001 |
| 2022/0124509 A1 | 4/2022 | Gummadi et al. | |
| 2023/0319716 A1* | 10/2023 | Sheik | H04W 52/028 |
| | | | 455/422.1 |

* cited by examiner

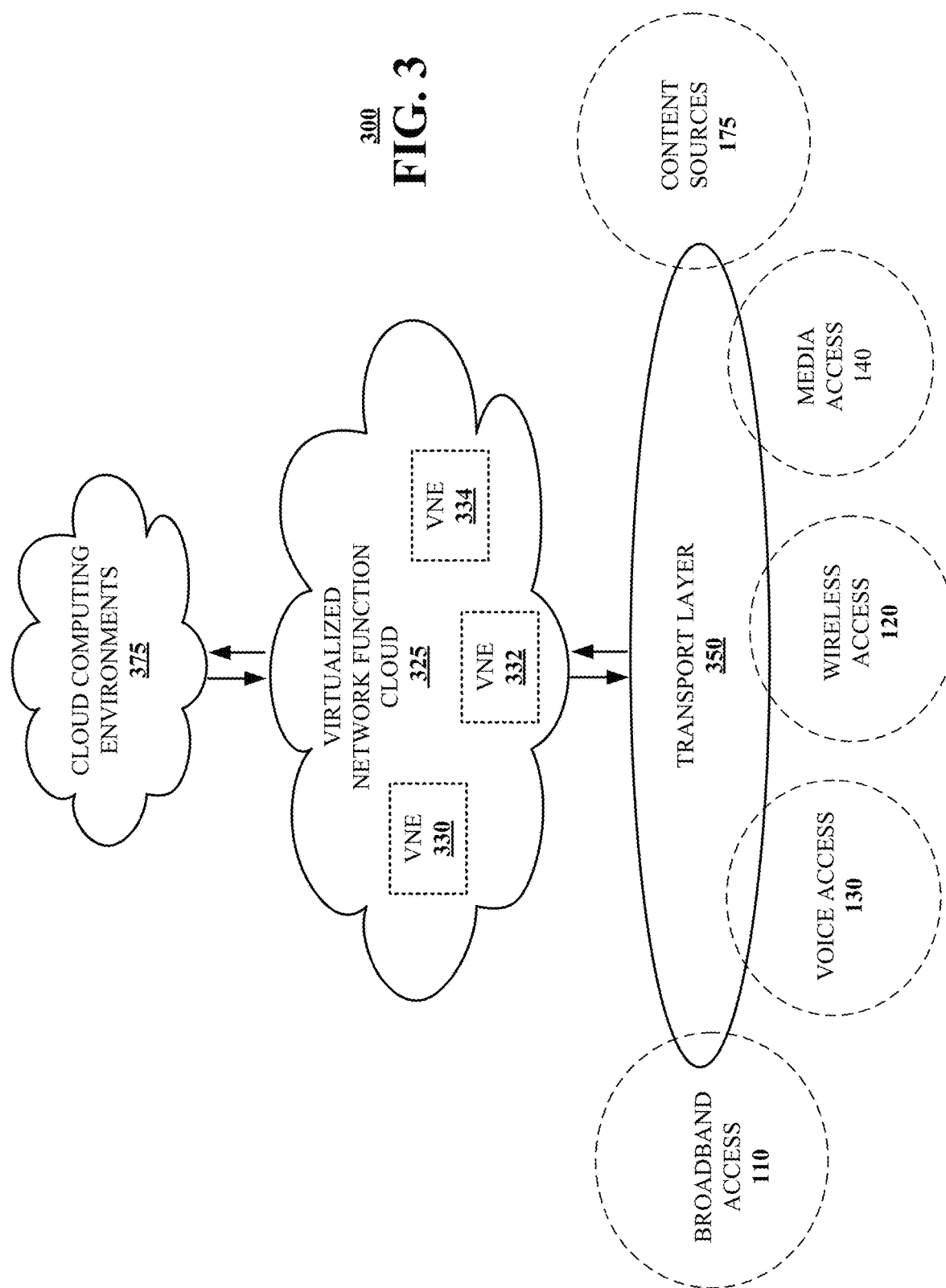

APPARATUSES AND METHODS FOR SELECTIVELY SCANNING RESOURCES OF A COMMUNICATION NETWORK AND SYSTEM

FIELD OF THE DISCLOSURE

The subject disclosure relates to apparatuses and methods for selectively scanning resources of a communication network and system.

BACKGROUND

As the world increasingly becomes connected through vast communication networks/systems and via various communication devices, additional opportunities are created/generated to provision data (e.g., media, content, etc.) to users. As technology associated with such networks/systems and devices continues to advance, users are now able to take advantage of/enjoy data-rich communication services, such as streaming audio and video at various resolutions (e.g., high-definition).

From a perspective of a network operator or service provider, it may be desirable to assign a communication device, such as a user equipment (UE) associated with a user, to a first frequency or first frequency range/band (as opposed to other frequencies or frequency ranges/bands) as part of providing communication services to the communication device. However, the communication device may need to engage a scanning or measurement procedure to identify and connect to resources (e.g., network/system infrastructure) associated with the first frequency or first frequency range/band. Depending on various factors/conditions, connection via the first frequency or first frequency range/band might not be possible or may be undesirable/suboptimal. Further, repetitive scanning/measurement in such a scenario may represent inefficiencies in terms of a consumption of resources (e.g., processing resources, power consumption/battery depletion) at/by the communication device and at/by network/system infrastructure (e.g., in terms of overhead signaling/traffic associated with attempts at connection).

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
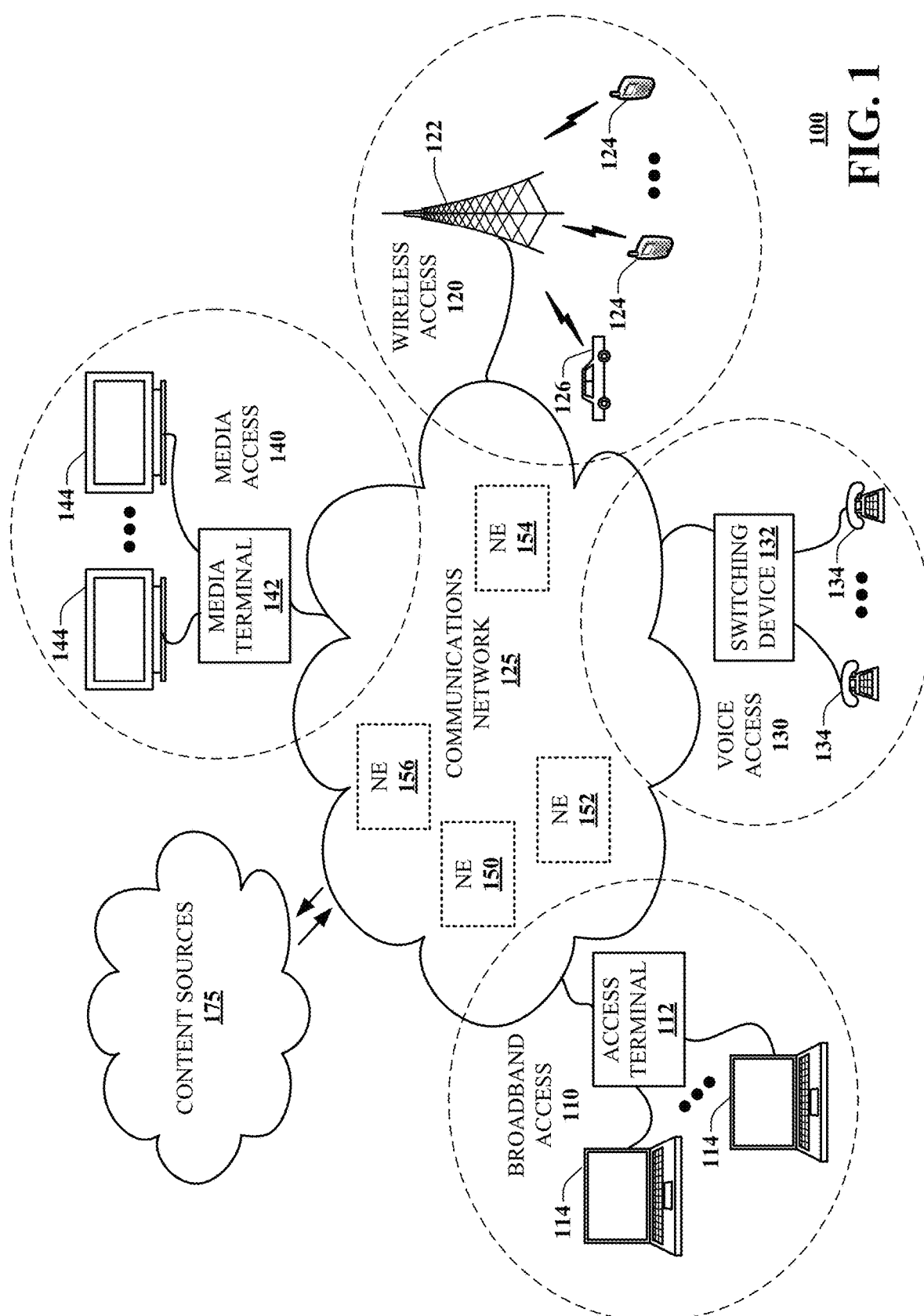
FIG. 1 is a block diagram illustrating an exemplary, non-limiting embodiment of a communications network in accordance with various aspects described herein.

The subject disclosure describes, among other things, illustrative embodiments for managing network/system resources and reducing power consumption/dissipation associated with a communication device by selectively enabling or disabling a scanning of signals associated with particular frequency bands or frequency ranges. Other embodiments are described in the subject disclosure.

One or more aspects of the subject disclosure include, in whole or in part, transmitting a first value for a first parameter to a first user equipment, wherein the first parameter pertains to a first number of scans to be performed by the first user equipment to detect a first signal having a first frequency within a first frequency band as part of a first scanning procedure; and transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band.

One or more aspects of the subject disclosure include, in whole or in part, performing a first measurement to determine a first signal strength of a first signal having a first frequency included in a first frequency band; based on the performing of the first measurement, comparing the first signal strength to a first threshold, resulting in a first comparison; determining, based on the first comparison, that the first signal strength is less than the first threshold, resulting in a first determination; based on the first determination, incrementing a first counter a first time; based on the incrementing of the first counter the first time, determining that a value of the first counter is less than a second threshold, resulting in a second determination; and based on the second determination, performing a second measurement to determine a second signal strength of a second signal having a second frequency included in the first frequency band.

One or more aspects of the subject disclosure include, in whole or in part, obtaining, by a processing system including a processor, a first part of a communication service via a first plurality of signals, wherein each signal of the first plurality of signals has a respective frequency that is included in a first range of frequencies; subsequent to the obtaining of the first part of the communication service, obtaining, by the processing system, a first signal that has a first frequency that is included in a second range of frequencies, the second range of frequencies being different from the first range of frequencies; determining, by the processing system, that the first signal has a first power level that is less than a threshold, resulting in a first determination; and based on the first determination, initiating a counting of a timer, wherein during the counting of the timer the processing system ceases scanning for signals having frequencies in the second range of frequencies.

Referring now to FIG. 1, a block diagram is shown illustrating an example, non-limiting embodiment of a system 100 in accordance with various aspects described herein. For example, system 100 can facilitate in whole or in part transmitting a first value for a first parameter to a first user equipment, wherein the first parameter pertains to a first number of scans to be performed by the first user equipment to detect a first signal having a first frequency within a first frequency band as part of a first scanning procedure, and transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band. System 100 can facilitate in whole or in part performing a first measurement to determine a first signal strength of a first signal having a first frequency included in a first frequency band, based on the performing of the first measurement, comparing the first signal strength to a first threshold, resulting in a first comparison, determining, based on the first comparison, that the first signal strength is less than the first threshold, resulting in a first determination, based on the first determination, incrementing a first counter a first time, based on the incrementing of the first counter the first time, determining that a value of the first counter is less than a second threshold, resulting in a second determination, and based on the second determination, performing a second measurement to determine a second signal strength of a second signal having a second frequency included in the first frequency band. System 100 can facilitate in whole or in part obtaining, by a processing system including a processor, a first part of a communication service via a first plurality of signals, wherein each signal of the first plurality of signals has a respective frequency that is included in a first range of frequencies, subsequent to the obtaining of the first part of the communication service, obtaining, by the processing system, a first signal that has a first frequency that is included in a second range of frequencies, the second range of frequencies being different from the first range of frequencies, determining, by the processing system, that the first signal has a first power level that is less than a threshold, resulting in a first determination, and based on the first determination, initiating a counting of a timer, wherein during the counting of the timer the processing system ceases scanning for signals having frequencies in the second range of frequencies.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
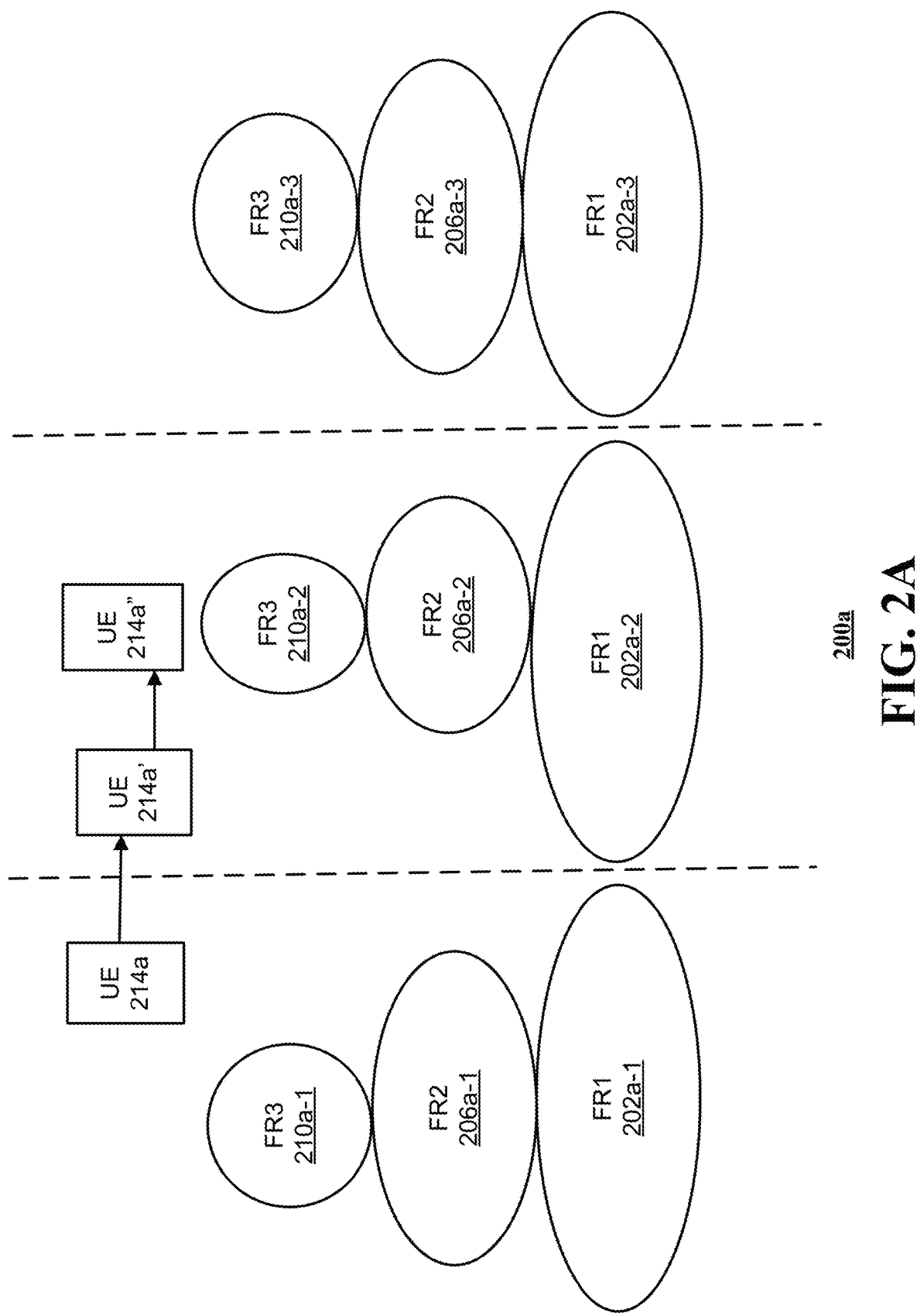
FIG. 2A is a block diagram illustrating an example, non-limiting embodiment of a system in accordance with various aspects described herein.

FIG. 2A is a block diagram illustrating an example, non-limiting embodiment of a system 200a in accordance with various aspects described herein. In some embodiments, one or more parts/portions of the system 200a may function within, or may be operatively overlaid upon, one or more parts/portions of the system 100 and/or the network 125 of FIG. 1.

The system 200a may include resources (e.g., network infrastructure) associated with various frequencies or frequency ranges/bands that may be used to provision communication services to a communication device, such as a user equipment (UE). For example, the system 200a may include resources to support communication services at/using a first frequency or first frequency range/band (generally represented as FR1), a second frequency or frequency range/band (generally represented as FR2), and a third frequency or frequency range/band (generally represented as FR3). The use of three frequencies or frequency ranges/bands in FIG. 2A is illustrative, which is to say that in some embodiments more or fewer than three frequencies or frequency ranges/bands may be used. Further, aspects of the frequencies or frequency ranges/bands (or associated resources) may be replicated across an area or region of coverage. In this regard, the first frequency/frequency band FR1 is represented by reference characters 202a-1, 202a-2, and 202a-3, the second frequency/frequency band FR2 is represented by reference characters 206a-1, 206a-2, and 206a-3, and the third frequency/frequency band FR3 is represented by reference characters 210a-1, 210a-2, and 210a-3.

Each of the frequencies/frequency bands FR1 through F3 may be distinguished from one another in terms of one or more parameters or characteristics. For example, the first frequency/frequency band FR1 may generally support the largest range of (geographical) coverage, but may have the lowest amount of capacity or bandwidth available for communication services. Conversely, the third frequency/frequency band FR3 may generally support the smallest range of (geographical) coverage, but may have the highest amount of capacity or bandwidth available for communication services. The second frequency/frequency band FR2 may effectively represent a mid-range frequency/frequency band in terms of the tradeoff between geographical coverage on the one hand and capacity or bandwidth on the other hand. All other conditions being assumed equal, the third frequency/frequency band FR3 may generally support data-rich communication services (e.g., streaming audio or video with high-fidelity and smooth playback), whereas the first frequency/frequency band FR1 might not support such data-rich services. Thus, and from a perspective of a quality of experience (QoE), end-users (e.g., subscribers) of communication services may benefit the most from an allocation/assignment to the third frequency/frequency band FR3.

In some embodiments, some UEs (such as older, dated, or legacy UEs) might not have the capability (e.g., might not have the technology) to connect to the second frequency/frequency band FR2 or the third frequency/frequency band FR3, which is to say that if such UEs are to obtain communication services they may need to connect to network/system resources via/using the first frequency/frequency band FR1 (similarly, some UEs may be able to connect via FR1 or FR2, but not via FR3). All other conditions being assumed equal, the foregoing implies that the resources associated with the first frequency/frequency band FR1 may tend to be utilized more regularly/heavily than the resources associated with the second frequency/frequency band FR2, and the resources associated with the second frequency/frequency band FR2 may tend to be utilized more regularly/heavily than the resources associated with the third frequency/frequency band FR3. Thus, and from a perspective of a network operator or service provider associated with the system 200a, the network operator/service provider may prefer to allocate as many UEs as possible to the third frequency/frequency band FR3 to preserve resources associated with, e.g., the first frequency/first frequency band FR1 and the second frequency/frequency band FR2. More generally, and from the perspective of the network operator or service provider associated with the system 200a, the network operator/service provider may prefer that UEs be assigned to the frequencies/frequency bands in the following priority order: FR3, then FR2, and finally FR1.

However, the conditions associated with a given UE at a particular point in time may be such that connection to network/system resources via, e.g., the third frequency/frequency band FR3 may be improper. For example, as part of connecting to resources associated with a given frequency/frequency band, the UE may need to engage in a measurement or scanning operation/procedure associated with that frequency/frequency band. That measurement/scanning operation consumes power and, in the case of a mobile UE, may result in a depletion of energy/power associated with a battery that powers the UE. Further, messages or signals that may be conveyed by the UE to network infrastructure may represent overhead or a penalty in terms of an increase in network traffic. Thus, aspects of this disclosure may selectively engage/enable (or, analogously, selectively disengage/disable) a UE in terms of one or more measurement/scanning operations/procedures to reduce wasteful/inefficient resource consumption as described in further detail below.

To demonstrate the foregoing, FIG. 2A depicts a UE at three different locations, at three different points in time, as represented by reference characters 214a, 214a' and 214", respectively. In this example, it may be assumed that the UE has the capabilities/resources to connect to network resources via each of the frequencies/frequency bands FR1, FR2, and FR3.

At the first location at the first point in time (214a), the UE may be outside of the range of coverage associated with the third frequency/frequency band FR3 (e.g., FR3 210a-1), but may be located within the range of coverage associated with the second frequency/frequency band FR2 (e.g., FR2 206a-1) and the range of coverage associated with the first frequency/frequency band FR1 (e.g., FR1 202a-1). Thus, and assuming the priority order/preference set forth above, at the first location/point in time (214a) the UE may obtain (a part/portion of) communication services via the second frequency/frequency band FR2 (e.g., FR2 206a-1).

Thereafter, at the second location/point in time (214a'), the UE may be located within the range of coverage associated with the first frequency/frequency band FR1 (e.g., FR1 202a-2), but may be located outside of the range of coverage associated with the second frequency/frequency band FR2 (e.g., FR2 206a-2) and the third frequency/frequency band FR3 (e.g., FR3 210a-2). Thus, at the second location/point in time (214a') the UE may obtain (a part/portion of) communication services via the first frequency/frequency band FR1 (e.g., FR1 202a-2).

Thereafter, at the third location/point in time (214a"), the UE may be located within the range of coverage associated with each of the first frequency/frequency band FR1 (e.g., FR1 202a-2), the second frequency/frequency band FR2 (e.g., FR2 206a-2) and the third frequency/frequency band FR3 (e.g., FR3 210a-2). Thus, and assuming the priority order/preference set forth above, at the third location/point in time (214a") the UE may obtain (a part/portion of) communication services via the third frequency/frequency band FR3 (e.g., FR3 210a-2).

In the foregoing example, it may be assumed that the UE spends a large amount of time (e.g., an amount of time that is greater than a threshold) at/near the second location 214a'; stated differently, the time difference/gap between the second point in time and the third point in time may be large (e.g., may exceed a threshold). To demonstrate by way of example, the second location 214a' may correspond to a library, and a user associated with the UE who is a student may be at the library and may be studying for a difficult examination that is to be administered the next day (frequently referred to as "cramming" in the art). Thus, the user might not move around very much while at the second location 214a', as the user may be immersed in study of material that is the subject of the examination. If the UE were to engage in a measurement or scan of the frequencies/frequency bands associated with FR2 or FR3 while at the second location 214a', the odds would be relatively low (if not zero) that the UE would be able to successfully connect to network resources via FR2 or FR3, given that the user associated with the UE is relatively still/stationary and the UE is outside of the respective ranges of coverage associated with FR2 and FR3. Thus, repeated/repetitive measurements or scans associated with the frequency or frequency bands/ranges associated with FR2 and FR3 in such a scenario would result in a consumption of power at/by the UE, with little (to no) likelihood of the UE being reassigned from the frequency or frequency bands/ranges associated with FR1 to the frequency or frequency bands/ranges associated with FR2 or FR3.

To address the foregoing, aspects of this disclosure may include instructions/directives being provided/issued to a communication device (such as the UE in the example embodiment of FIG. 2A) to pause/cease measuring/scanning a particular carrier (such as a carrier associated with FR2 or a carrier associated with FR3 in the foregoing example pertaining to the user studying in the library) for a certain amount of time after a threshold/certain number of scans associated with the carrier fails to yield/result in a reassignment of the communication device to that carrier. To demonstrate, Table 1 shown below illustrates a table of timer values for each of a plurality of frequencies/frequency bands (e.g., FR1, FR2, and FR3) relative to different types/classes of mobility. In particular, in Table 1 the different types/classes of mobility are illustratively referred to/labeled as: (1) stationary (not moving), (2) motion detected but still stationary, (3) walking, (4) driving (slow speed), and (5) driving (high speed) or high-speed train, aircraft, marine vessel. The nomenclature of the labels (1)-(5) is illustrative, which is to say that, more generally, the different types/classes of mobility may be distinguished from one another on the basis/use of one or more thresholds. A comparison of the mobility/movement of the communication device relative to the different thresholds may serve to slot the communication device into a particular one of the types/classes of mobility shown. Stated differently, an identification/determination of mobility may serve as a basis for selecting a particular timer value. While five types/classes of mobility are shown in Table 1, some embodiments may utilize a different count/number of types/classes of mobility.

TABLE 1

Timer Values For Different Frequencies/Frequency Bands (FR3 – FR1)

| Type of Mobility | FR3 | FR2 | FR1 |
|---|---|---|---|
| Stationary (not moving) | A3 | A2 | A1 |
| Motion detected but still stationary | B3 | B2 | B1 |
| Walking | C3 | C2 | C1 |
| Driving (slow speed) | D3 | D2 | D1 |
| Driving (high speed) or high-speed train, aircraft, marine vessel | E3 | E2 | E1 |

In Table 1 above, each of the timer values (A3, A2, A1, B3, B2, B1, C3, C2, C1, D3, D2, D1, E3, E2, E1) may be separately/independently configurable. That said, and all other conditions being assumed equal, within a given column of Table 1 the 'A' timer values (e.g., A3) may be set larger than their counterpart 'B' timer values (e.g., B3), the 'B' timer values (e.g., B3) may be set larger than their counterpart 'C' timer values (e.g., C3), and so forth, which is to say that the less mobile the communication device is the lower the likelihood is that the communication device will be able to connect to network/system resources via the given frequency/frequency band (or associated carrier) once the communication device has failed to connect via that frequency/frequency band. Similarly, and again with all other conditions being assumed equal, within a given row of Table 1 the timer value associated with FR3 (e.g., A3) may be set larger than the timer value associated with FR2 (e.g., A2), and the timer value associated with FR2 (e.g., A2) may be set larger than the timer value associated with FR1 (e.g., A1) due to the fact that the geographical range of coverage may increase from FR3 to FR2, and from FR2 to FR1.

The timer values that are to be utilized (such as, for example, the timer values shown in Table 1 above) may be implemented as one or more timers or counters. The timer values that may be utilized by a communication device may be included as part of a message or signal that may be provided to the communication device. In some embodiments, a default set of timer values may initially be established within the communication device (such as, for example, at the time that the communication device is manufactured or assembled) and the default set of timer values may be replaced/overwritten with one or more other sets of timer values. Aspects of the timers/timer values described above may be implemented in respect of the threshold(s) that are utilized in respect of the number of (failed) scans/measurements that are to be performed by the communication device before enabling/triggering (a counting of) the timers/counters.

Figure 2B:
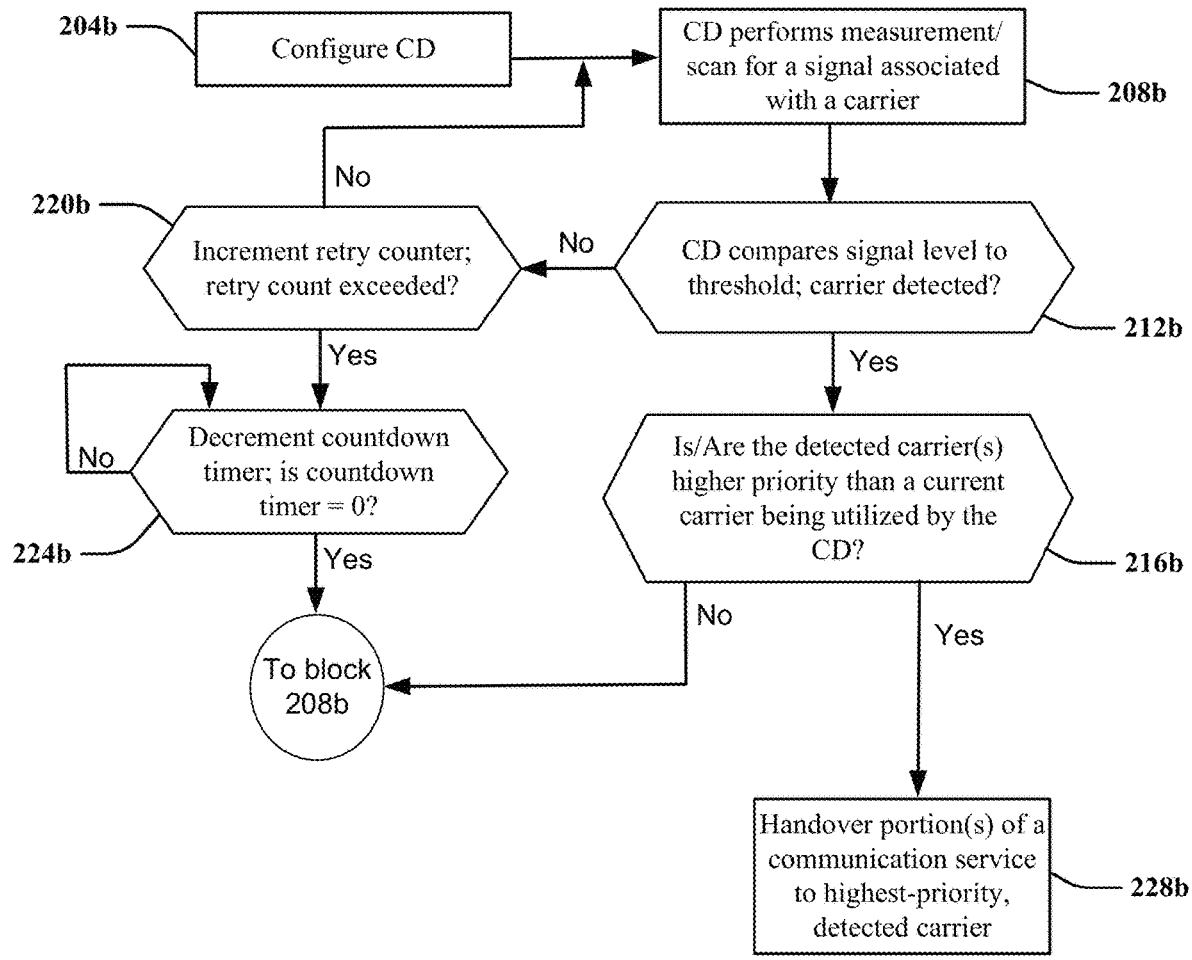
FIG. 2B depicts an illustrative embodiment of a method in accordance with various aspects described herein.

Referring now to FIG. 2B, an illustrative embodiment of a method 200b in accordance with various aspects described herein is shown. The method 200b may be implemented or executed, in whole or in part, by one or more systems, devices, and/or components, such as for example the systems, devices, and components described herein. The method 200b may facilitate a preservation of resources (such as, for example, a reserve of available battery power or energy, processing resources, etc.) in respect of communication services provided to a communication device.

In block 204b, a communication device (CD) may be configured. The configuration of block 204b may include an identification of one or more thresholds or threshold values to utilize in relation to a given frequency/frequency range/band or carrier. For example, the threshold values may be specified in terms of a power level of the given frequency/frequency range/band or carrier that is deemed acceptable/satisfactory for use in relation to communication services. The threshold values may include a specification of a number of measurements/scans that are to be performed by the CD to detect a signal associated with the carrier in an amount that is greater than the specified power level before ceasing/pausing such measurements/scans. The configuration of block 204b may include an identification of values for timers or counters as described above in relation to a failure to detect the signal (with a power level exceeding the threshold) associated with the carrier. Block 204b may include transmitting a message or signal containing information pertaining to the configuration to the CD. The CD may store the values of the configuration for use by the CD.

In block 208b, the CD may perform a measurement of/scan for a signal associated with a given carrier (or frequency or frequency range associated therewith). Block 208b may be repeated/replicated for each carrier that the CD may potentially utilize.

In block 212b, the CD may compare a level of signal power associated with the signal (as measured in block 208b) to a threshold that has been associated with the carrier (as specified in block 204b). If, based on the comparison, the level of signal power that is measured is determined to exceed the threshold, it may be said that the carrier has been detected by the CD and flow may proceed from block 212b to block 216b; otherwise, it may be said that the carrier has not been detected by the CD and flow may proceed from block 212b to block 220b.

In block 216b, a determination may be made regarding whether the carrier(s) detected in block 212b is/are of a higher priority level relative to a priority level of a current carrier that may be utilized by the CD (if any). If the determination of block 216b is answered in the affirmative, flow may proceed from block 216b to block 228b; otherwise, flow may proceed from block 216b to block 208b. As part of the flow from block 216b to block 208b, a retry counter (see, e.g., block 220b) may be reinitialized/cleared to zero.

In block 220b, a retry counter associated with a number of retries to detect the given carrier may be incremented (in this regard, it is noted that the retry counter may have been initialized to have a value of zero as part of block 204b), and a determination may be made whether a retry count specified by the retry counter is greater than a threshold (where the threshold may be specified as part of, e.g., block 204b). If the determination of block 220b is answered in the affirmative, flow may proceed from block 220b to block 224b; otherwise, flow may proceed from block 220b to block 208b to continue scanning in an effort to detect the carrier. As part of the flow from block 220b to block 224b, a countdown timer may be initialized with a value corresponding to a threshold (where that threshold may be specified as part of, e.g., block 204b).

In block 224b, the countdown timer may be decremented, and a determination may be made whether the countdown timer has reached a value of zero (or some other value). If not, flow may remain at block 224b to continue the process of decrementing the countdown timer until the countdown timer reaches the value of zero. Once the value of the countdown timer reaches zero, and thus the determination of block 224 is answered in the affirmative, flow may proceed from block 224b to block 208b. As part of the flow from block 224b to block 208b, the retry counter (see, e.g., block 220b) may be reinitialized/cleared to zero.

In block 228b, one or more portions of a communication service that is provided to the CD may be handed over to, or facilitated by, a highest-priority carrier that was detected as part of block 212b. Block 228b may include a termination of one or more connections to network/system resources via one or more lower-priority carriers.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may be implemented in relation to one or more technical specifications. For example, aspects of this disclosure may be included or incorporated as part of one or more technical specifications associated with the $3^{rd}$ Generation Partnership Project (3GPP).

Aspects of this disclosure may be included or incorporated as part of one or more practical applications. For example, aspects of this disclosure may be included or incorporated as part of decision-making processes or logic that may be facilitated by one or more communication devices in respect of communication services that are to be provided. Such communication services may include, without limitation, services pertaining to: presentations of media or other content, vehicular applications or operations, voice calls, text and email messaging, manufacturing processes, etc.

Aspects of this disclosure may represent substantial improvements relative to conventional technology. For example, aspects of this disclosure may selectively disable a measurement or scan of a carrier (or associated frequency or frequency range/band) by a communication device when the carrier is either not present (within a given geographical range relative to the communication device) or is present but provides a "weak signal" (e.g., a signal with a strength that is less than a threshold). In this manner, unnecessary power dissipation on the part of the communication device may be reduced or even completely avoided. Aspects of this disclosure may enable the communication device to be allocated or assigned to a highest-priority carrier, which may be useful from a perspective of a network operator or service provider in respect of balancing or distributing a service load amongst network/system resources. Furthermore, a dynamic assignment or reassignment of one or more thresholds or threshold values that may be utilized by the communication device can facilitate an adaptive network or system that is capable of responding to changes in conditions, such as changes in environmental factors, changes in user or application demand, etc. In this regard, network/system resources may be managed to facilitate efficient, productive uses. A subset of communication devices may be reassigned from first resources to second resources in bulk, or as a group/batch, thereby obtaining significant (and potentially efficient) changes quickly (e.g., in a period of time less than a threshold). That said, aspects of this disclosure may be implemented on an individualized basis, thereby enabling a tailoring/customization to be achieved in respect of any particular user or device.

Aspects of this disclosure may serve to allocate/assign a communication device to a higher or highest-capacity carrier or frequency/frequency range/band. As a result, a quality of experience (QoE) that is provided to a user (e.g., a subscriber) of communication services may be enhanced.

Aspects of this disclosure provide a framework for disabling a scanning of one or more cells or frequencies (e.g., NR cells) based on measurement and/or motion detection. In some embodiments, a network (or associated infrastructure) may instruct a UE to scan cells (e.g., NR cells) based on a priority order (e.g., a priority order of 5G frequency bands). The UE may adhere to one or more specifications (e.g., 3GPP specifications) to measure or scan the cells. As described above, a battery of the UE may tend to quickly deplete if the UE repeats the scanning but is unable to connect/camp on high-priority cells. Thus, the UE may cease scanning specific carriers (e.g., NR carriers) after a certain number of scans. In some embodiments, a timer may be configured with a value after the certain number of scans have been performed; upon an expiration of the timer the UE may resume a scanning of the specific carriers. The value of timer may be based on a detection of motion of the UE. By virtue of the foregoing, UE battery depletion may be reduced if, for example, the network (or associated infrastructure) incorrectly configures certain non-active frequencies for the UE to scan.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part transmitting a first value for a first parameter to a first user equipment, wherein the first parameter pertains to a first number of scans to be performed by the first user equipment to detect a first signal having a first frequency within a first frequency band as part of a first scanning procedure, and transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band. Virtualized communication network 300 can facilitate in whole or in part performing a first measurement to determine a first signal strength of a first signal having a first frequency included in a first frequency band, based on the performing of the first measurement, comparing the first signal strength to a first threshold, resulting in a first comparison, determining, based on the first comparison, that the first signal strength is less than the first threshold, resulting in a first determination, based on the first determination, incrementing a first counter a first time, based on the incrementing of the first counter the first time, determining that a value of the first counter is less than a second threshold, resulting in a second determination, and based on the second determination, performing a second measurement to determine a second signal strength of a second signal having a second frequency included in the first frequency band. Virtualized communication network 300 can facilitate in whole or in part obtaining, by a processing system including a processor, a first part of a communication service via a first plurality of signals, wherein each signal of the first plurality of signals has a respective frequency that is included in a first range of frequencies, subsequent to the obtaining of the first part of the communication service, obtaining, by the processing system, a first signal that has a first frequency that is included in a second range of frequencies, the second range of frequencies being different from the first range of frequencies, determining, by the processing system, that the first signal has a first power level that is less than a threshold, resulting in a first determination, and based on the first determination, initiating a counting of a timer, wherein during the counting of the timer the processing system ceases scanning for signals having frequencies in the second range of frequencies.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
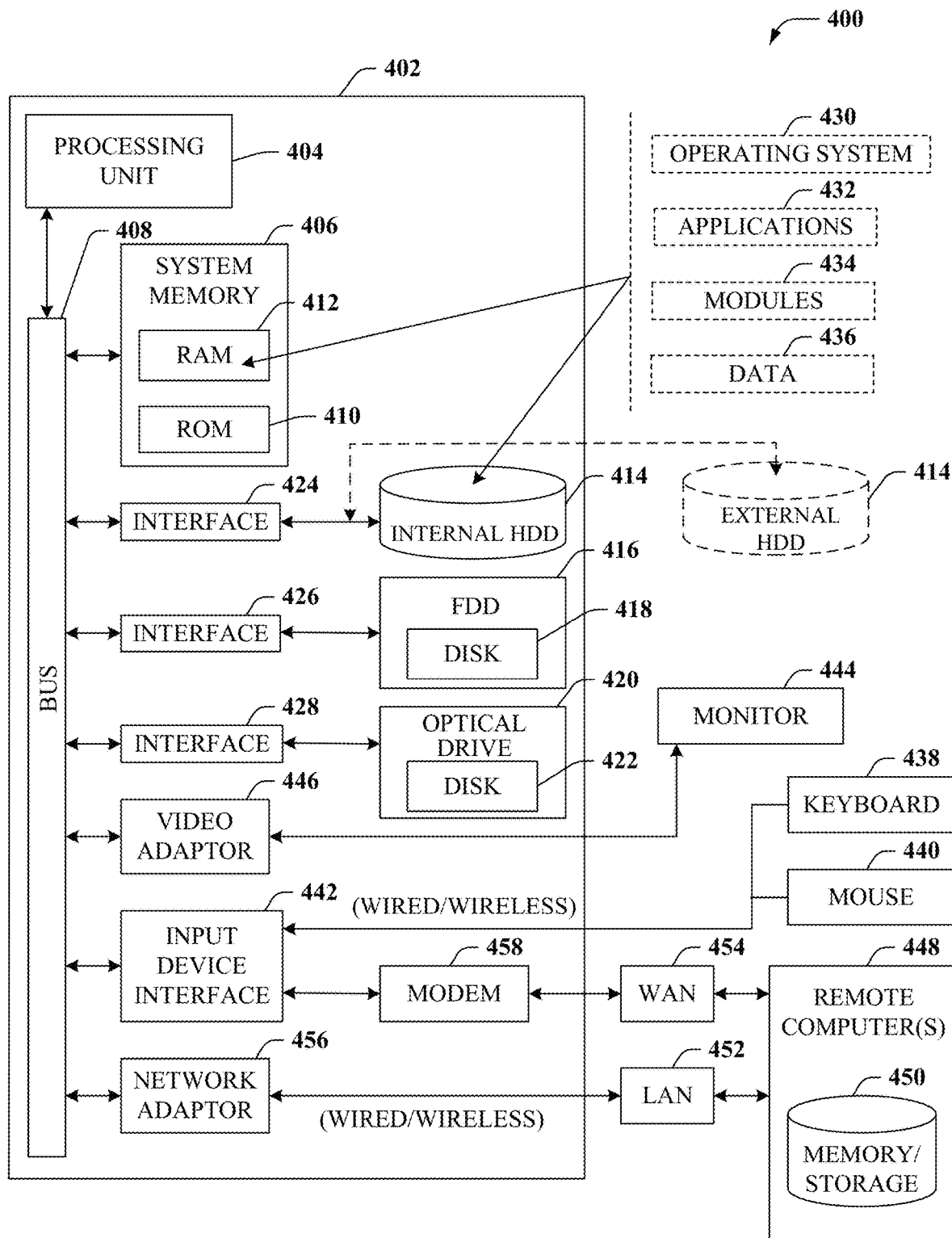
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part transmitting a first value for a first parameter to a first user equipment, wherein the first parameter pertains to a first number of scans to be performed by the first user equipment to detect a first signal having a first frequency within a first frequency band as part of a first scanning procedure, and transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band. Computing environment 400 can facilitate in whole or in part performing a first measurement to determine a first signal strength of a first signal having a first frequency included in a first frequency band, based on the performing of the first measurement, comparing the first signal strength to a first threshold, resulting in a first comparison, determining, based on the first comparison, that the first signal strength is less than the first threshold, resulting in a first determination, based on the first determination, incrementing a first counter a first time, based on the incrementing of the first counter the first time, determining that a value of the first counter is less than a second threshold, resulting in a second determination, and based on the second determination, performing a second measurement to determine a second signal strength of a second signal having a second frequency included in the first frequency band. Computing environment 400 can facilitate in whole or in part obtaining, by a processing system including a processor, a first part of a communication service via a first plurality of signals, wherein each signal of the first plurality of signals has a respective frequency that is included in a first range of frequencies, subsequent to the obtaining of the first part of the communication service, obtaining, by the processing system, a first signal that has a first frequency that is included in a second range of frequencies, the second range of frequencies being different from the first range of frequencies, determining, by the processing system, that the first signal has a first power level that is less than a threshold, resulting in a first determination, and based on the first determination, initiating a counting of a timer, wherein during the counting of the timer the processing system ceases scanning for signals having frequencies in the second range of frequencies.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
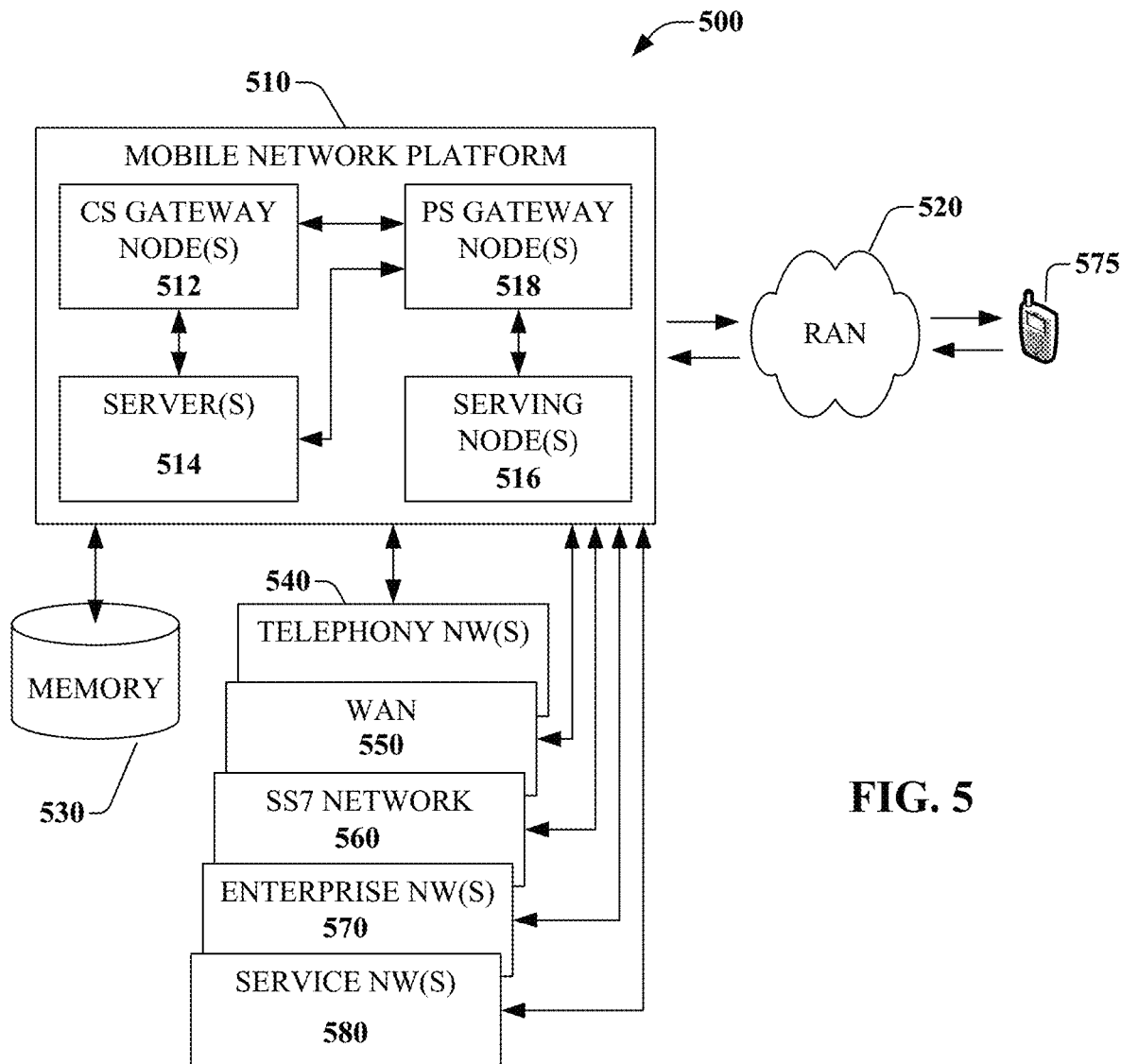
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part transmitting a first value for a first parameter to a first user equipment, wherein the first parameter pertains to a first number of scans to be performed by the first user equipment to detect a first signal having a first frequency within a first frequency band as part of a first scanning procedure, and transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band. Platform 510 can facilitate in whole or in part performing a first measurement to determine a first signal strength of a first signal having a first frequency included in a first frequency band, based on the performing of the first measurement, comparing the first signal strength to a first threshold, resulting in a first comparison, determining, based on the first comparison, that the first signal strength is less than the first threshold, resulting in a first determination, based on the first determination, incrementing a first counter a first time, based on the incrementing of the first counter the first time, determining that a value of the first counter is less than a second threshold, resulting in a second determination, and based on the second determination, performing a second measurement to determine a second signal strength of a second signal having a second frequency included in the first frequency band. Platform 510 can facilitate in whole or in part obtaining, by a processing system including a processor, a first part of a communication service via a first plurality of signals, wherein each signal of the first plurality of signals has a respective frequency that is included in a first range of frequencies, subsequent to the obtaining of the first part of the communication service, obtaining, by the processing system, a first signal that has a first frequency that is included in a second range of frequencies, the second range of frequencies being different from the first range of frequencies, determining, by the processing system, that the first signal has a first power level that is less than a threshold, resulting in a first determination, and based on the first determination, initiating a counting of a timer, wherein during the counting of the timer the processing system ceases scanning for signals having frequencies in the second range of frequencies.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
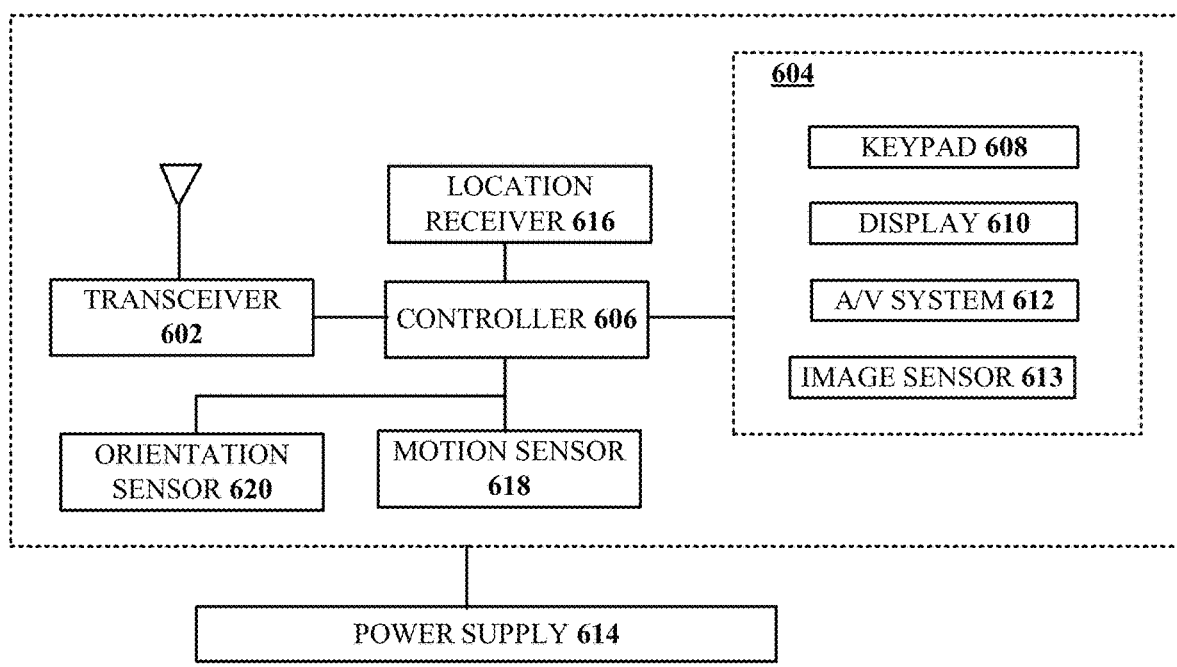
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part transmitting a first value for a first parameter to a first user equipment, wherein the first parameter pertains to a first number of scans to be performed by the first user equipment to detect a first signal having a first frequency within a first frequency band as part of a first scanning procedure, and transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band. Computing device 600 can facilitate in whole or in part performing a first measurement to determine a first signal strength of a first signal having a first frequency included in a first frequency band, based on the performing of the first measurement, comparing the first signal strength to a first threshold, resulting in a first comparison, determining, based on the first comparison, that the first signal strength is less than the first threshold, resulting in a first determination, based on the first determination, incrementing a first counter a first time, based on the incrementing of the first counter the first time, determining that a value of the first counter is less than a second threshold, resulting in a second determination, and based on the second determination, performing a second measurement to determine a second signal strength of a second signal having a second frequency included in the first frequency band. Computing device 600 can facilitate in whole or in part obtaining, by a processing system including a processor, a first part of a communication service via a first plurality of signals, wherein each signal of the first plurality of signals has a respective frequency that is included in a first range of frequencies, subsequent to the obtaining of the first part of the communication service, obtaining, by the processing system, a first signal that has a first frequency that is included in a second range of frequencies, the second range of frequencies being different from the first range of frequencies, determining, by the processing system, that the first signal has a first power level that is less than a threshold, resulting in a first determination, and based on the first determination, initiating a counting of a timer, wherein during the counting of the timer the processing system ceases scanning for signals having frequencies in the second range of frequencies.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example"

or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
transmitting a first value for a first parameter to a first user equipment, wherein the first parameter pertains to a first number of scans to be performed by the first user equipment to detect a first signal having a first frequency within a first frequency band as part of a first scanning procedure;
transmitting a second value for a second parameter to the first user equipment, wherein the second parameter pertains to a first amount of time that the first user equipment is to wait between the first scanning procedure and a second scanning procedure, the second scanning procedure pertaining to detection of the first signal having the first frequency within the first frequency band; and
transmitting a third value for a third parameter to the first user equipment for use by the first user equipment as part of the first scanning procedure, wherein the third value pertains to a first signal power level threshold associated with detection of the first signal by the first user equipment.

2. The device of claim 1, wherein the transmitting of the first value causes the first user equipment to store the first value in conjunction with the first parameter, and wherein the transmitting of the second value causes the first user equipment to store the second value in conjunction with the second parameter.

3. The device of claim 2, wherein the operations further comprise:
subsequent to the transmitting of the first value, transmitting a fourth value for the first parameter to the first user equipment that causes the first user equipment to overwrite the first value stored at the first user equipment with the fourth value, wherein the fourth value is different from the first value.

4. The device of claim 2, wherein the operations further comprise:
subsequent to the transmitting of the second value, transmitting a fourth value for the second parameter to the first user equipment that causes the first user equipment to overwrite the second value stored at the first user equipment with the third value, wherein the fourth value is different from the second value.

5. The device of claim 1, wherein the operations further comprise:
transmitting a fourth value for a third parameter to the first user equipment, wherein the third parameter pertains to a second number of scans to be performed by the first user equipment to detect a second signal having a second frequency within a second frequency band as part of a third scanning procedure.

6. The device of claim 5, wherein the fourth value is different from the first value such that the second number of scans is different from the first number of scans.

7. The device of claim 5, wherein the second frequency band is different from the first frequency band.

8. The device of claim 5, wherein the operations further comprise:
transmitting a fifth value for a fourth parameter to the first user equipment, wherein the fourth parameter pertains to a second amount of time that the first user equipment is to wait between the third scanning procedure and a fourth scanning procedure, the fourth scanning procedure pertaining to the detection of the second signal having the second frequency within the second frequency band.

9. The device of claim 8, wherein the fifth value is different from the second value such that the second amount of time is different from the first amount of time.

10. The device of claim 1, wherein the operations further comprise:
subsequent to the transmitting of the third value, transmitting a fourth value for the third parameter to the first user equipment for use by the first user equipment as part of the second scanning procedure, wherein the fourth value pertains to a second signal power level threshold associated with detection of the first signal by the first user equipment, and wherein the fourth value is different from the third value.

11. The device of claim 1, wherein the operations further comprise:
transmitting the first value for the first parameter to a second user equipment.

12. The device of claim 11, wherein the operations further comprise:
transmitting the second value for the second parameter to the second user equipment, a third user equipment, or a combination thereof.

13. The device of claim 1, wherein the first user equipment is powered by a battery, and wherein the operations further comprise:
determining an amount of mobility of the first user equipment; and
selecting the second value from a plurality of different values based on the determining of the amount of mobility of the first user equipment.

14. The device of claim 1, wherein the operations further comprise:
handing over a portion of a communication service that is provided to the first user equipment based on the first scanning procedure, the second scanning procedure, and a third scanning procedure.

15. A non-transitory machine-readable medium, comprising executable instructions that, when executed by a processing system including a processor, facilitate performance of operations, the operations comprising:
performing a first measurement to determine a first signal strength of a first signal having a first frequency included in a first frequency band;
based on the performing of the first measurement, comparing the first signal strength to a first threshold, resulting in a first comparison;
determining, based on the first comparison, that the first signal strength is less than the first threshold, resulting in a first determination;
based on the first determination, incrementing a first counter a first time;
based on the incrementing of the first counter the first time, determining that a value of the first counter is less than a second threshold, resulting in a second determination; and
based on the second determination, performing a second measurement to determine a second signal strength of a second signal having a second frequency included in the first frequency band.

16. The non-transitory machine-readable medium of claim 15, wherein the operations further comprise:
- based on the performing of the second measurement, comparing the second signal strength to the first threshold, resulting in a second comparison;
- determining, based on the second comparison, that the second signal strength is less than the first threshold, resulting in a third determination;
- based on the third determination, incrementing the first counter a second time;
- based on the incrementing of the first counter the second time, determining that the value of the first counter is equal to or greater than the second threshold, resulting in a fourth determination; and
- based on the fourth determination, initiating a counting of a second counter, wherein during the counting of the second counter the processing system does not scan for signals having frequencies included in the first frequency band.

17. The non-transitory machine-readable medium of claim 15, wherein the operations further comprise:
- based on the performing of the second measurement, comparing the second signal strength to the first threshold, resulting in a second comparison;
- determining, based on the second comparison, that the second signal strength is equal to or greater than the first threshold, resulting in a third determination;
- based on the third determination, determining that the first frequency band has a higher priority relative to a second frequency band, resulting in a fourth determination, wherein the processing system obtains a first part of a communication service utilizing a first plurality of signals, each of the first plurality of signals having a frequency in the second frequency band; and
- based on the fourth determination, the processing system obtaining a second part of the communication service utilizing a second plurality of signals, each of the second plurality of signals having a frequency in the first frequency band.

18. The non-transitory machine-readable medium of claim 17, wherein each frequency in the first frequency band is greater than each frequency in the second frequency band.

19. A method, comprising:
- obtaining, by a processing system including a processor, a first part of a communication service via a first plurality of signals, wherein each signal of the first plurality of signals has a respective frequency that is included in a first range of frequencies;
- subsequent to the obtaining of the first part of the communication service, obtaining, by the processing system, a first signal that has a first frequency that is included in a second range of frequencies, the second range of frequencies being different from the first range of frequencies;
- determining, by the processing system, that the first signal has a first power level that is less than a threshold, resulting in a first determination; and
- based on the first determination, initiating a counting of a timer, wherein during the counting of the timer the processing system ceases scanning for signals having frequencies in the second range of frequencies.

20. The method of claim 19, further comprising:
- subsequent to a completion of the counting of the timer, obtaining, by the processing system, a second signal that has a second frequency that is included in the second range of frequencies;
- determining, by the processing system, that the second signal has a second power level that is equal to or greater than the threshold, resulting in a second determination;
- based the second determination, determining, by the processing system, that the second range of frequencies is a higher priority range of frequencies relative to the first range of frequencies in respect of the communication service, resulting in a third determination; and
- based on the third determination, obtaining, by the processing system, a second part of the communication service via a second plurality of signals, wherein each signal of the second plurality of signals has a respective frequency that is included in the second range of frequencies.

* * * * *